United States Patent
Eiland

(10) Patent No.: US 11,221,168 B2
(45) Date of Patent: Jan. 11, 2022

(54) COMPRESSOR RETROFIT ASSEMBLY

(71) Applicant: Samuel Eiland, Hayden, AL (US)

(72) Inventor: Samuel Eiland, Hayden, AL (US)

( * ) Notice: Subject to any disclaimer, the term of this patent is extended or adjusted under 35 U.S.C. 154(b) by 260 days.

(21) Appl. No.: 16/662,999

(22) Filed: Oct. 24, 2019

(65) Prior Publication Data

US 2021/0123647 A1    Apr. 29, 2021

(51) Int. Cl.
  *F25B 49/02* (2006.01)
  *H02P 27/06* (2006.01)
  *H02J 5/00* (2016.01)

(52) U.S. Cl.
  CPC .............. *F25B 49/022* (2013.01); *H02J 5/00* (2013.01); *H02P 27/06* (2013.01); *F25B 2600/021* (2013.01)

(58) Field of Classification Search
  None
  See application file for complete search history.

(56) References Cited

U.S. PATENT DOCUMENTS

| | | |
|---|---|---|
| 3,683,237 A | 8/1972 | Walstad |
| D249,883 S | 10/1978 | Collins |
| 4,187,093 A | 2/1980 | Boratgis |
| 5,018,050 A | 5/1991 | Maenishi |
| 8,947,155 B2 | 2/2015 | Takahashi |
| 2007/0074536 A1 | 4/2007 | Bai |
| 2008/0115527 A1* | 5/2008 | Doty ............ F25B 49/025 62/498 |
| 2019/0203716 A1* | 7/2019 | Borkowski ........ F04C 18/16 |
| 2020/0200467 A1* | 6/2020 | Park ............ F25D 23/126 |

* cited by examiner

*Primary Examiner* — Jared Fureman
*Assistant Examiner* — Aqeel H Bukhari

(57) ABSTRACT

A compressor retrofit assembly for replacing a D/C compressor with an A/C compressor includes a control unit that is installable in a refrigerator when the compressor in the refrigerator has failed. The control unit is electrically coupled with an existing power supply in the refrigerator, a compressor relay of a replacement compressor for the refrigerator, an existing power input of a fan in the refrigerator and a coil of the compressor relay of the replacement compressor. The control unit supplies electrical power to the coil of the compressor relay thereby facilitating the compressor relay to be closed. In this way the control unit supplies operational voltage to the replacement compressor.

7 Claims, 3 Drawing Sheets

COMPRESSOR RETROFIT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to retrofit device and more particularly pertains to a new retrofit device for replacing a D/C voltage compressor with an A/C voltage compressor.

(2) Description of Related Art Including Information Disclosed Under 37 CFR 1.97 and 1.98

The prior art relates to retrofit device.

BRIEF SUMMARY OF THE INVENTION

An embodiment of the disclosure meets the needs presented above by generally comprising a control unit that is installable in a refrigerator when the compressor in the refrigerator has failed. The control unit is electrically coupled with an existing power supply in the refrigerator, a compressor relay of a replacement compressor for the refrigerator, an existing power input of a fan in the refrigerator and a coil of the compressor relay of the replacement compressor. The control unit supplies electrical power to the coil of the compressor relay thereby facilitating the compressor relay to be closed. In this way the control unit supplies operational voltage to the replacement compressor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
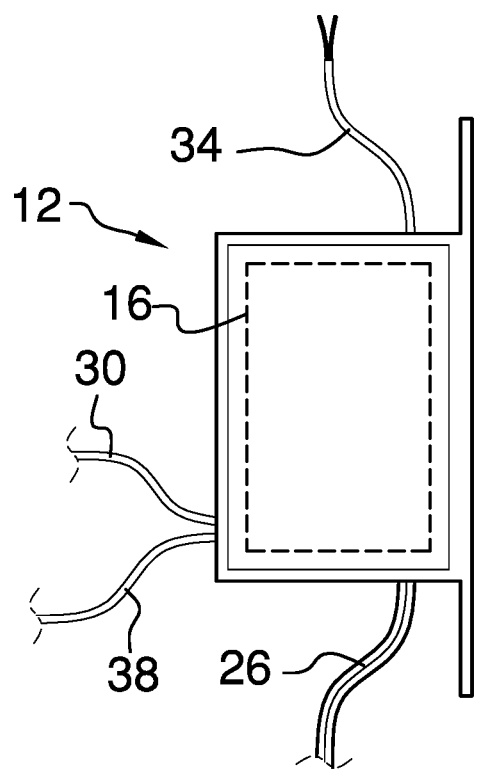
FIG. 1 is a right side phantom view of a compressor retrofit assembly according to an embodiment of the disclosure.
Figure 2:
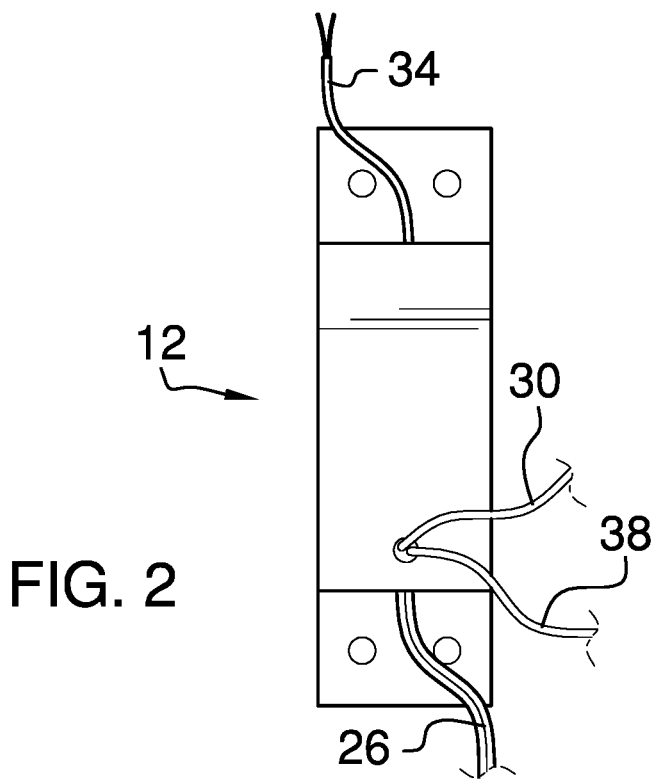
FIG. 2 is a bottom view of an embodiment of the disclosure.
Figure 3:
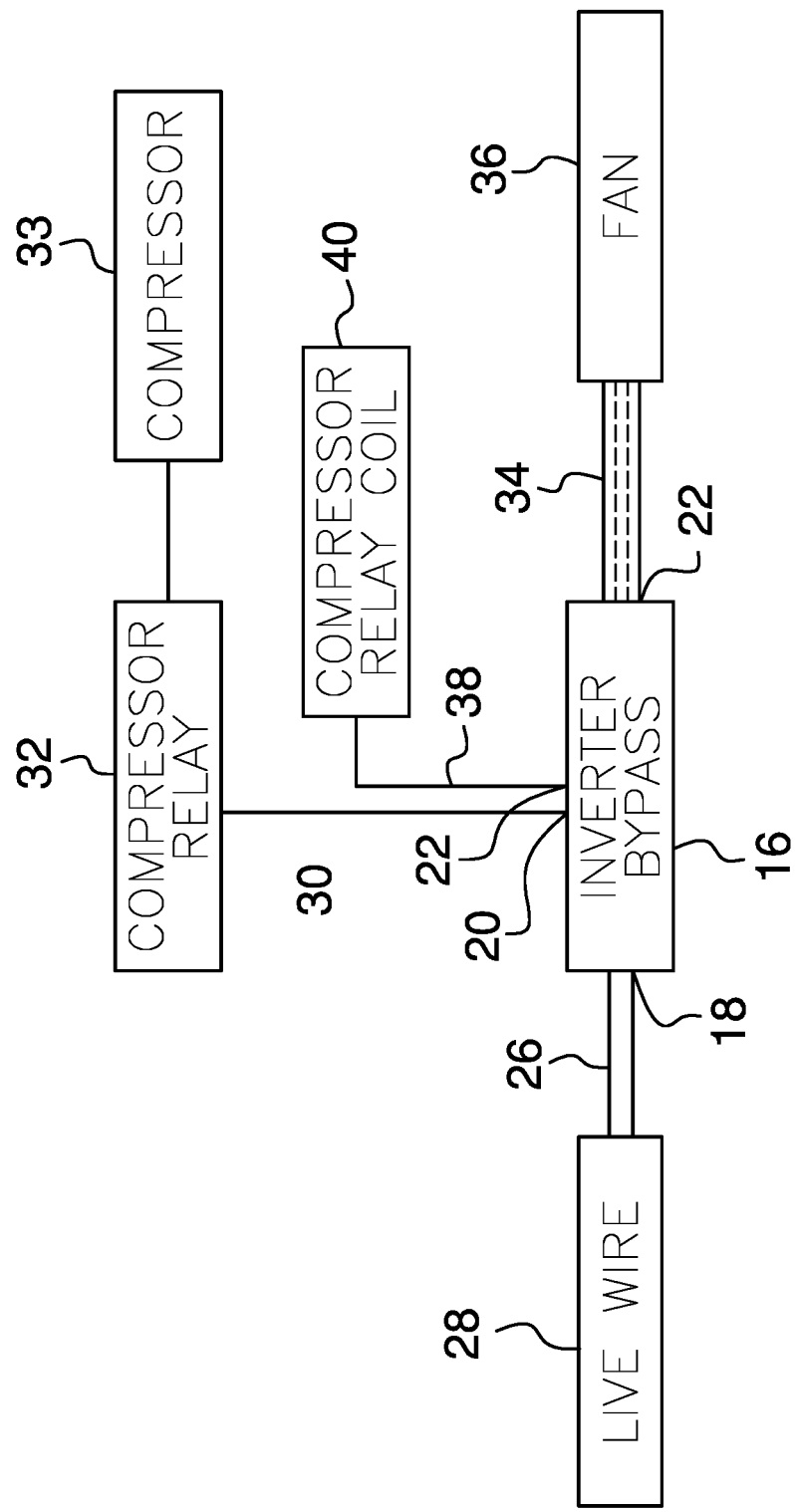
FIG. 3 is a schematic view of an embodiment of the disclosure.
Figure 4:
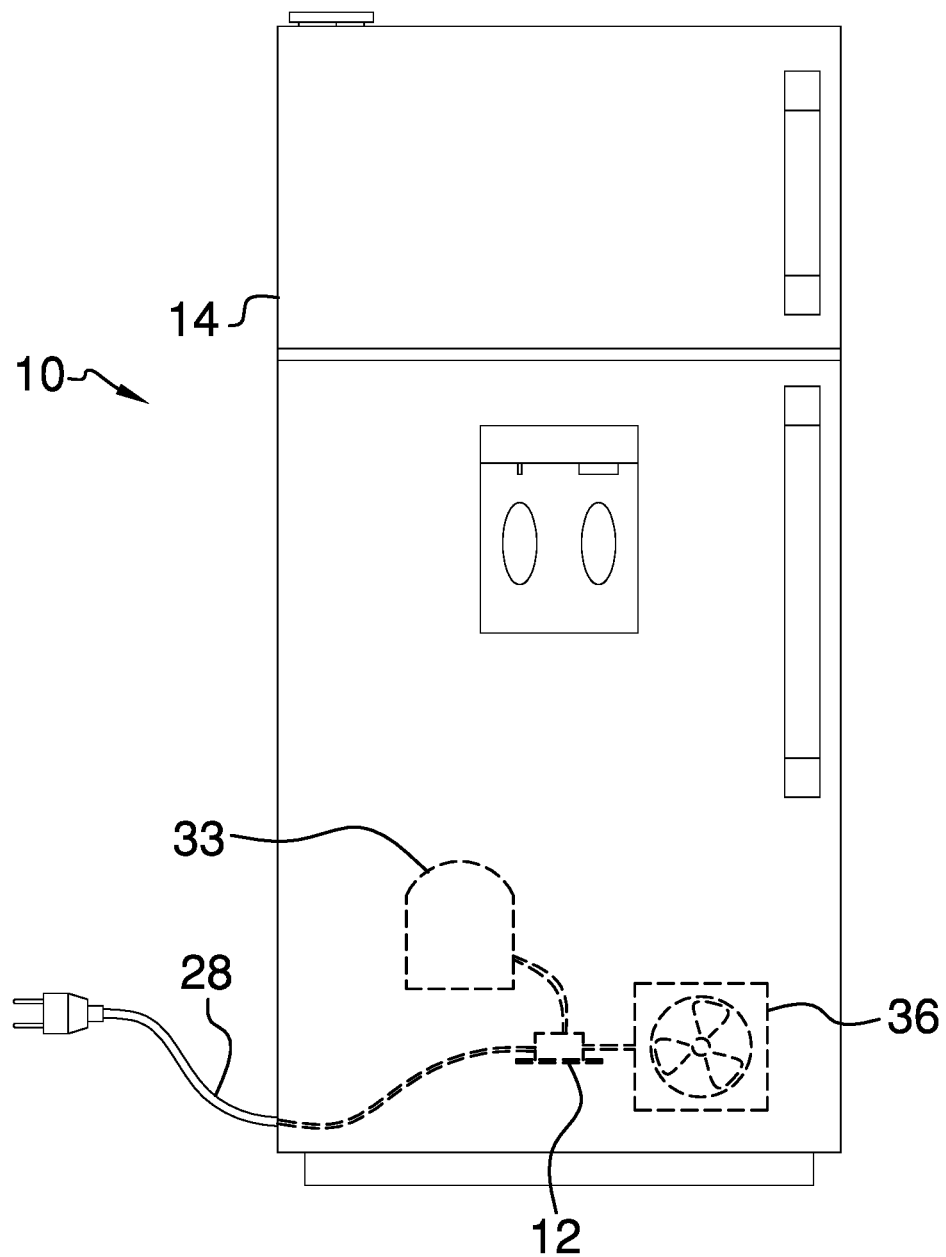
FIG. 4 is a phantom in-use view of an embodiment of the disclosure.

With reference now to the drawings, and in particular to FIGS. 1 through 4 thereof, a new retrofit device embodying the principles and concepts of an embodiment of the disclosure and generally designated by the reference numeral 10 will be described.

As best illustrated in FIGS. 1 through 4, the compressor retrofit assembly 10 generally comprises a control unit 12 that is installable in a refrigerator 14 when the compressor in the refrigerator 14 has failed. The control unit 12 comprises an electronic inverter bypass 16. The electronic inverter bypass 16 has a power input 18, a high voltage output 20, a first low voltage output 22 and a second low voltage output 24. The compressor in the refrigerator 14 may comprise a D/C voltage compressor such as is currently employed by LG Electronics Inc, Yeouido-dong, Seoul, South Korea. Additionally, the refrigerator 14 may be a residential refrigerator such as is manufactured by LG Electronics Inc.

An input conductor 26 is electrically coupled to the control unit 12 and the input conductor 26 is electrically spliced with an existing power supply 28 in the refrigerator 14. In this way the control unit 12 receives electrical power from the refrigerator 14. The existing power supply 28 in the refrigerator 14 may be the live voltage wire for the existing compressor circuit in the refrigerator 14. Additionally, the input conductor 26 is electrically coupled to the power input 18 of the electronic inverter bypass 16. The input conductor 26 includes a pair of wires, each being spliced with a voltage lead and a ground lead of the existing power supply 28 in the refrigerator 14. Additionally, the existing power supply 28 in the refrigerator 14 supplies A/C voltage to the input conductor 26.

A high output conductor 30 is electrically coupled to the control unit 12 and the high output conductor 30 is in electrical communication with the input conductor 26. The high output conductor 30 is electrically spliced with a compressor relay 32 of a replacement compressor 33 for the refrigerator 14. In this way the high output conductor 30 can supply electrical power to the compressor relay 32 of the replacement compressor 33. The high output conductor 30 is electrically coupled to the high voltage output 20 of the electronic inverter bypass 16. The replacement compressor 33 may be an older style of refrigerator compressor that uses A/C voltage rather than D/C voltage. Additionally, the high output conductor 30 may have red colored insulation for visually identifying the high output conductor 30 as a voltage supply wire.

A first low output conductor 34 is electrically coupled to the control unit 12 and the first low output conductor 34 is in electrical communication with the input conductor 26. The first low output conductor 34 is electrically spliced with an existing power input of a fan 36 in the refrigerator 14. In this way the first low output conductor 34 can supply electrical power to the existing power input of the fan 36. The first low output conductor 34 is electrically coupled to the first low voltage output 22 of the electronic inverter bypass 16. Additionally, the first low output conductor 34 may have red colored insulation.

A second low output conductor 38 is electrically coupled to the control unit 12 and the second low output conductor 38 is in electrical communication with the input conductor 26. The second low output conductor 38 is electrically spliced with a coil 40 of the compressor relay 32 of the replacement compressor 33. Thus, the compressor relay 32 is closed thereby facilitating the compressor relay 32 to supply operational voltage to the replacement compressor 33. The second low output conductor 38 is electrically coupled to the second low voltage output 24 of the electronic inverter bypass 16. Additionally, the second low output conductor 38 may have white colored insulation.

In use, the existing compressor in the refrigerator 14 is removed when the existing compressor has failed. The control unit 12 is installed in the refrigerator 14 to facilitate A/C voltage to be supplied to the replacement compressor 33. In this way the existing compressor, which runs on D/C voltage, can be replaced with the replacement compressor 33, which runs on A/C voltage. Thus, the refrigerator 14 can be retrofitted with an A/C compressor that is more reliable than a D/C compressor without requiring any alterations of the internal circuitry of the refrigerator 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A compressor retrofit assembly being configured to facilitate a D/C compressor in a refrigerator to be retrofitted with an A/C compressor, said assembly comprising:
   a control unit being installable in a refrigerator when the compressor in the refrigerator has failed;
   an input conductor being electrically coupled to said control unit, said input conductor being electrically spliced with an existing power supply in the refrigerator wherein said control unit is configured to receive electrical power from the refrigerator;
   a high output conductor being electrically coupled to said control unit, said high output conductor being in electrical communication with said input conductor, said high output conductor being electrically spliced with a compressor relay of a replacement compressor for the refrigerator wherein said high output conductor is configured to supply electrical power to the compressor relay;
   a first low output conductor being electrically coupled to said control unit, said first low output conductor being in electrical communication with said input conductor, said first low output conductor being electrically spliced with an existing power input of a fan in the refrigerator wherein said first low output conductor is configured to supply electrical power to the existing power input of the fan; and
   a second low output conductor being electrically coupled to said control unit, said second low output conductor being in electrical communication with said input conductor, said second low output conductor being electrically spliced with a coil of the compressor relay of the replacement compressor wherein said second low output conductor is configured to supply electrical power to the coil of the compressor relay thereby facilitating the compressor relay to be closed for supplying operational voltage to the replacement compressor.

2. The assembly according to claim 1, wherein said control unit comprises an electronic inverter bypass, said electronic inverter bypass having a power input, a high voltage output, a first low voltage output and a second low voltage output.

3. The assembly according to claim 2, wherein said input conductor is electrically coupled to said power input of said electronic inverter bypass.

4. The assembly according to claim 3, wherein said high output conductor is electrically coupled to said high voltage output of said electronic inverter bypass.

5. The assembly according to claim 3, wherein said first low output conductor is electrically coupled to said first low voltage output of said electronic inverter bypass.

6. The assembly according to claim 3, wherein said second low output conductor is electrically coupled to said second low voltage output of said electronic inverter bypass.

7. A compressor retrofit assembly being configured to facilitate a D/C compressor in a refrigerator to be retrofitted with an A/C compressor, said assembly comprising:
   a control unit being installable in a refrigerator when the compressor in the refrigerator has failed, said control unit comprising an electronic inverter bypass, said electronic inverter bypass having a power input, a high voltage output, a first low voltage output and a second low voltage output;
   an input conductor being electrically coupled to said control unit, said input conductor being electrically spliced with an existing power supply in the refrigerator wherein said control unit is configured to receive electrical power from the refrigerator, said input conductor being electrically coupled to said power input of said electronic inverter bypass;
   a high output conductor being electrically coupled to said control unit, said high output conductor being in electrical communication with said input conductor, said high output conductor being electrically spliced with a compressor relay of a replacement compressor for the refrigerator wherein said high output conductor is configured to supply electrical power to the compressor relay, said high output conductor being electrically coupled to said high voltage output of said electronic inverter bypass;

a first low output conductor being electrically coupled to said control unit, said first low output conductor being in electrical communication with said input conductor, said first low output conductor being electrically spliced with an existing power input of a fan in the refrigerator wherein said first low output conductor is configured to supply electrical power to the existing power input of the fan, said first low output conductor being electrically coupled to said first low voltage output of said electronic inverter bypass; and a second low output conductor being electrically coupled to said control unit, said second low output conductor being in electrical communication with said input conductor, said second low output conductor being electrically spliced with a coil of the compressor relay of the replacement compressor wherein said second low output conductor is configured to supply electrical power to the coil of the compressor relay thereby facilitating the compressor relay to be closed for supplying operational voltage to the replacement compressor, said second low output conductor being electrically coupled to said second low voltage output of said electronic inverter bypass.

* * * * *